July 30, 1935.    W. A. GWYNN    2,009,549
VULCANIZING DEVICE
Filed Dec. 12, 1932    2 Sheets-Sheet 1

INVENTOR:
WILLIAM A. GWYNN.
By Bruce S. Elliott
ATTORNEY.

July 30, 1935.  W. A. GWYNN  2,009,549
VULCANIZING DEVICE
Filed Dec. 12, 1932   2 Sheets—Sheet 2
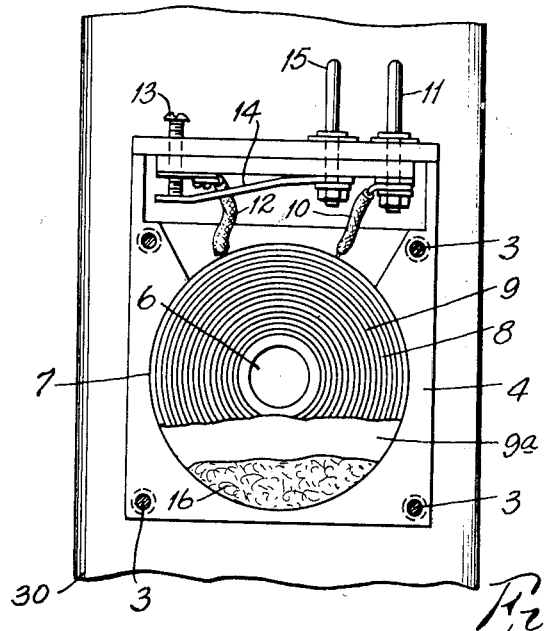
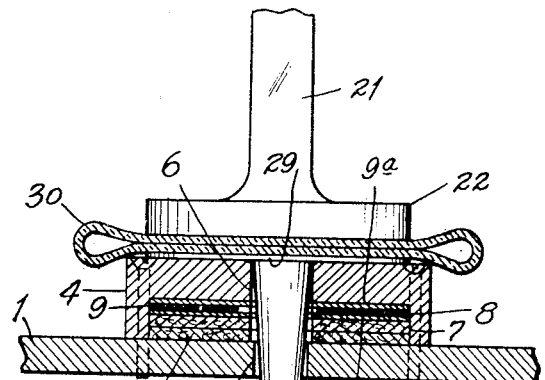
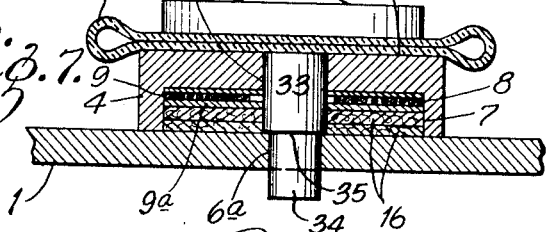
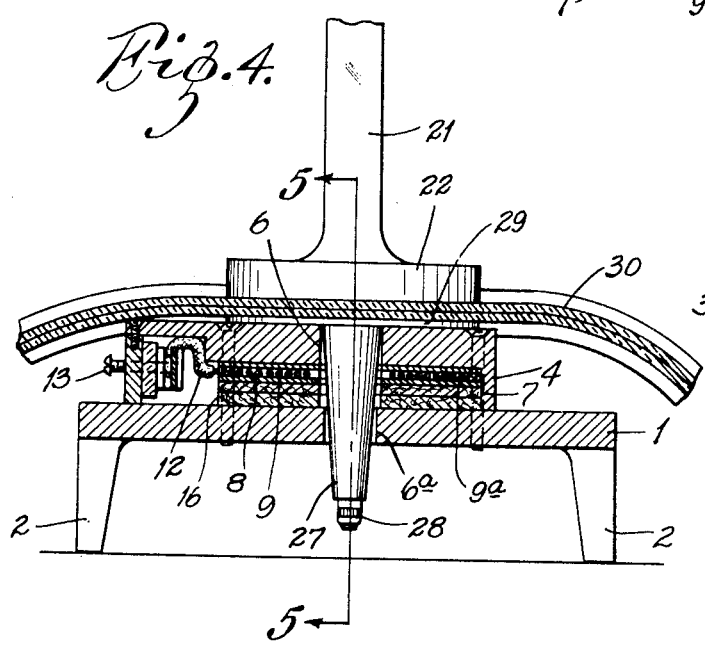
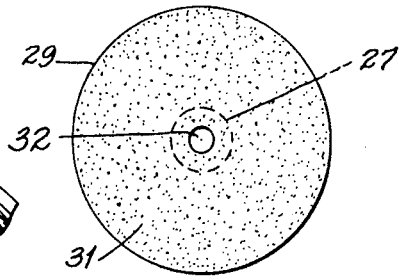
INVENTOR:
WILLIAM A. GWYNN
By Bruce S. Elliott
ATTORNEY.

UNITED STATES PATENT OFFICE 2,009,549

VULCANIZING DEVICE

William A. Gwynn, St. Louis, Mo.

Application December 12, 1932, Serial No. 646,759

4 Claims. (Cl. 18—18)

This invention relates to vulcanizing apparatus of a construction particularly designed to enable rubber valve stems to be vulcanized in position on the inner tubes of tires.

Ordinarily, valve stems are of metal. In recent times, however, a rubber valve stem has been proposed as a substitute for the valve stem of metal, and such rubber valve stems are coming more and more into use. Such a valve stem may be briefly described as consisting of a tubular rubber member, usually of tapered shape, having the valve inserted in its outer, or smaller, end and provided at its opposite end with a flat, circular rubber base, which is intended to be vulcanized to the inner tube. To thoroughly vulcanize the base of the valve stem to the tube, it is necessary that heat shall be employed, as, if it be secured by cement, or otherwise than by vulcanization, there is great danger of the base being loosened in use; and even when vulcanized, a relatively high degree of heat, applied for a sufficient length of time, is necessary to permanently secure the base of the stem on the tube, as otherwise, that is, if not thoroughly vulcanized, the base is liable to work loose under the heating of the tube caused by the rotation of the tire in the travel of the car, and to cause leaks to occur.

As is well known, heat is inimical to the life of rubber, and heretofore, so far as I am aware, no means has been devised which will enable the base of a rubber valve stem to be securely vulcanized to the tube without at the same time applying an objectionable degree of heat to the outer end of the valve stem containing the valve, and thus weakening or softening the rubber so that leakage around the valve will occur.

It is the object of my invention, therefore, to provide a simple and economical vulcanizing device which will permit the proper degree of heat to be applied uniformly to all parts of the rubber base while the latter is held under pressure in contact with the inner tube, and at the same time avoid the danger of applying an objectionable degree of heat to the outer end portion of the valve stem enclosing the valve.

The dominant features of the invention consist of a vulcanizing block for the above purpose, presenting a vulcanizing surface against which the base of the valve stem may rest in the vulcanizing operation, and so constructed that the outer end of the stem proper containing the valve may extend beyond said block to a point remote from said vulcanizing surface, and of means for permitting a vulcanizing heat to be applied to the vulcanizing surface in an area surrounding the portion of the block occupied by said stem.

The vulcanizing block is provided with an opening through which the stem of the valve projects when in vulcanizing position thereon, and the invention contemplates the use of a plug to be inserted in said opening to close the same and provide a flat surface when the device is used in vulcanizing patches on the tube to close punctures therein.

The invention is illustrated in the accompanying drawings, in which:

Figure 3 is a bottom plan view partly broken away, illustrating the heating unit;

Figure 4 is a sectional view on an enlarged scale taken on the line 4—4 of Figure 2;

Figure 5 is a sectional view taken on the line 5—5 of Figure 4;

Figure 6 is a bottom plan view of a rubber valve stem; and

Figure 7 is a view similar to Figure 5, but showing a plug inserted in the opening of the vulcanizing block, and a tube in position on the latter, this view illustrating the use of the device in vulcanizing a patch on the tube to close a puncture.

Figure 1:
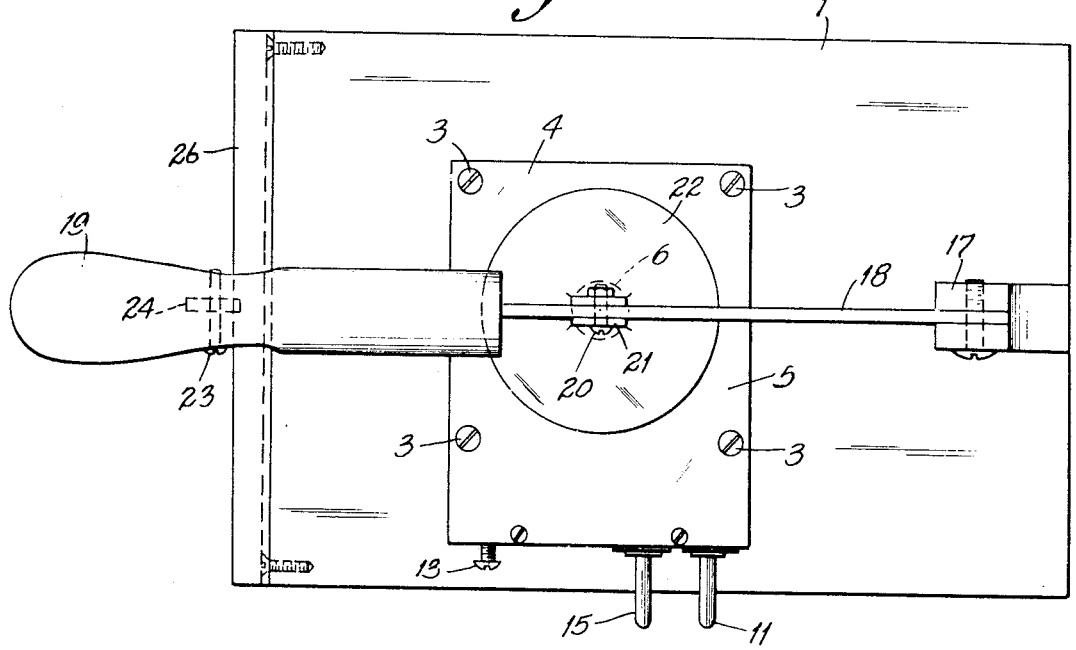
Figure 1 is a top plan view of a vulcanizing device constructed according to my invention.
Figure 2:
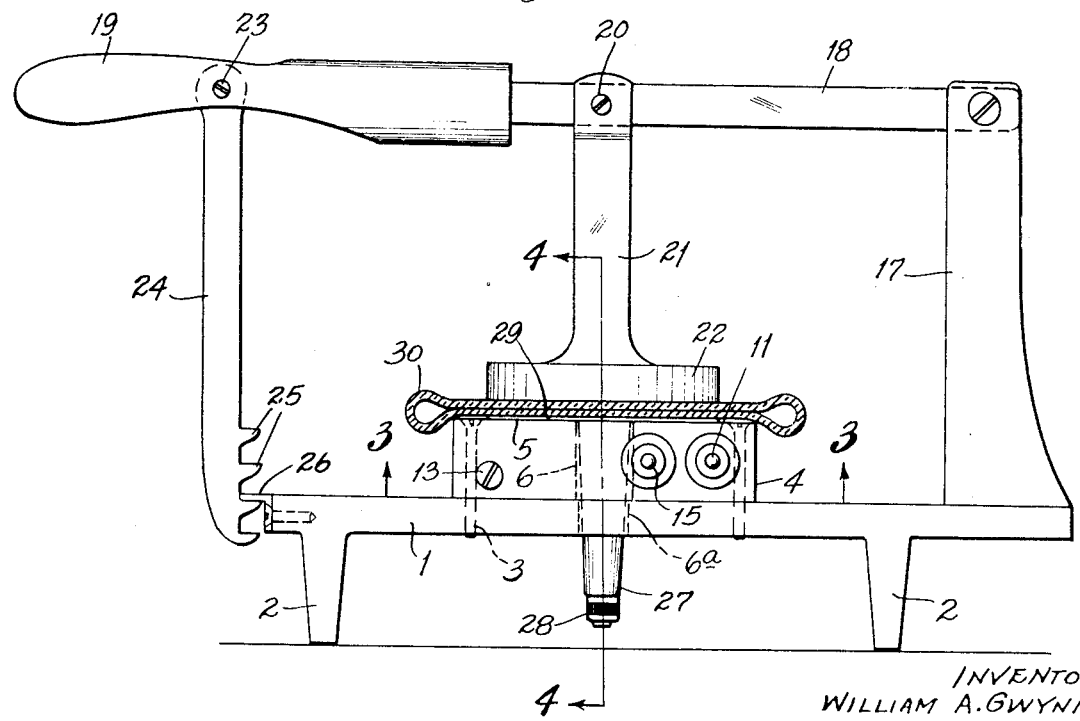
Figure 2 is a cross sectional view thereof.

Referring now to the drawings, the numeral 1 indicates a rectangular base having legs, 2, for supporting it on a table, bench, or the like. Secured on the base 1 by means of screws, 3, is a vulcanizing block, 4, having on one side a flat vulcanizing surface, 5, and extending centrally through which is a circular opening, 6, which is continued through the base 1 as an aperture 6ª of smaller diameter, as shown in Figures 4, 5 and 7. Within the block 4, and opening from the under side thereof, is a circular recess, 7, within which is mounted an electrical heating unit, 8, comprising a flat coil of insulated wire, 9, surrounding the aperture 6 and enclosed between sheets of mica, 9ª. One end of said coil is connected by a conductor, 10, directly to a contact post, 11, and the other end by a conductor, 12, to an adjustable contact screw, 13. A thermostatic bar, 14, is secured at one end to a second contact post, 15, and at its other end bears against the end of the contact screw 13. While the invention is not concerned with the heating element per se, it may be explained that in vulcanizing it is necessary to prevent the heat from exceeding a given maximum, otherwise the rubber will be burned. This danger is obviated by the thermostatic bar 14, which, under a given degree of heat, will break contact with the contact screw 13 and thus shut off the current to the heating coil. One or more layers of heat insulating material, such as asbestos disks, 16, are inserted in the recess 7 to lie against the under side of the heating unit, after which the vulcanizing block is secured on the base 1 by means of the screws 3.

Pivotally mounted on a standard, 17, on one end of the base 1 is a lever, 18, having an operating handle, 19. Pivotally mounted at 20 at an intermediate portion of the lever 18 and depending therefrom is a bar, 21, carrying at its lower end a circular pressure plate, 22. Pivotally mounted at 23 in the handle portion of lever 18 is an arm, 24, carrying at its lower end teeth, 25, adapted to engage the under side of a lug, 26, secured on the end of the base 1.

In operation, when it is desired to vulcanize a rubber valve stem to a tube, the stem, 27, is inserted into the aperture 6, so that its outer end containing the valve, 28, will project a considerable distance below the base 1, and, of course, beyond the vulcanizing block and the source of heat mounted therein. The circular rubber base, 29, will rest upon the vulcanizing surface 5, directly above the circular heating unit 8, and the outer side or face of said rubber base being exposed. An inner tube, 30, is then placed in position on the vulcanizing block in engagement with the base 29 of the valve stem, after which the handle 19 is grasped by the operator and pressed downward to force the pressure plate into engagement with the inner tube and the latter into firm contact with the exposed side of the rubber base 29, such pressure contact being maintained by the engagement of one or the other of the teeth 25 over the lug 26. The exposed face of the rubber base 29 is coated with vulcanizing material, as indicated at 31 in Figure 6, and when current is applied to the heating unit by placing a plug leading from a source of current on the contacts 11 and 15, the resultant heat will cause the base 29 of the valve stem to be securely vulcanized to the inner tube. It will be understood, of course, that the tube 30 is provided with an aperture which is made to coincide with the aperture 32, Figure 6, extending through the base 29 and the stem 27 of the valve stem.

By observing Figure 4, it will be seen that the vulcanizing heat is directly applied to the vulcanizing surface 5 in a circular area surrounding the opening 6, and owing to the interposition of the asbestos disks 16 between the heating unit 8 and the base 1, practically all of the heat will be transmitted to the upper portion of the vulcanizing block, and to the vulcanizing surface 5, and no heat, of a temperature that would deleteriously affect the rubber, will be transmitted to the outer end portion of the stem 27. Thus the requisite degree of heat can be employed and applied for a determined length of time to produce thorough vulcanization, without any liability of injuriously affecting the valve stem, and particularly the outer part thereof carrying the valve. As shown by Figure 4, the stem 27 is tapering, and is therefore out of contact with the vulcanizing block except at the point where the stem unites with the base 29.

In the preferred embodiment of the invention, I use an electrical heating unit, such as shown in the drawings and above described; but I wish it understood that my invention is not limited to such means of applying a vulcanizing heat, and any other heating means may be employed which, in operation, applies the heat to the vulcanizing surface in an area surrounding the stem proper of the rubber valve stem and in a zone substantially removed from the end of the latter containing the valve.

When using the device for vulcanizing patches on the tube, as in closing punctures, I insert a plug, 33, Figure 7, in the opening 6, which plug has an extension, 34, fitting in the aperture 6ª and projecting beyond the underside of the base 1. The plug 33 fits snugly within the opening 6, at its lower end affording a shoulder, 35, which rests on the base 1, and its upper end being flush with the surface of the block 4, and said surface permits ordinary vulcanizing operations to be performed. To remove the plug, it is only necessary to drive it upward by hitting the projecting end of extension 34.

I claim:

1. A vulcanizing device comprising a base having an aperture therein, a block mounted on said base presenting a vulcanizing surface and having an opening therein coinciding with said aperture but of larger diameter and a plug adapted to be removably seated in said opening at will, to have its upper end lie flush with said surface and its lower end rest on said base, and having an extension extending into and through the aperture in said base, said extension presenting means for enabling the plug to be removed by impact applied to the end thereof.

2. A device for vulcanizing rubber valve stems to inner tubes comprising a base having an aperture therein, a block mounted on said base presenting a vulcanizing surface and having an opening therein in alignment with said aperture for receiving the valve stem, and an electrical heating unit for said vulcanizing surface mounted in said block and having an aperture coinciding with the opening therein the aggregate thickness of the block and base being such that the outer end of the valve stem, when its base is in vulcanizing position on the block, will extend through said aperture and beyond the under side of said base.

3. A device for vulcanizing rubber valve stems to inner tubes comprising a base having an aperture therein, a block mounted on said base presenting a vulcanizing surface and having an opening therein in alignment with said aperture for receiving the valve stem and an enlarged recess in its lower side, an electrical heating unit for said vulcanizing surface mounted in said recess and having an aperture coinciding with the opening in the block, and a heat insulating member also mounted in said recess and covering the side of said heating unit remote from said vulcanizing surface, the aggregate thickness of the block and base being such that the outer end of the valve stem, when its base is in vulcanizing position on the block, will extend through said aperture and beyond the under side of said base.

4. In a device for vulcanizing rubber valve stems to tubes, a member having a vulcanizing surface provided with an opening for receiving the valve stem, and an electric heating unit associated with said member and having an opening registering with the opening in said vulcanizing surface, said heating unit being disposed to concentrate the heat over a localized area of the vulcanizing surface immediately adjacent said openings whereby to connect effectively the valve stem to the tube during the vulcanizing operation, the overall thickness of said member and said heating unit relative to the length of the valve stem being such that the valve stem extends sufficiently beyond the heating unit to avoid excessive heating of the outer end portion of the valve stem.

WILLIAM A. GWYNN.